United States Patent
Machida et al.

(10) Patent No.: US 9,908,106 B2
(45) Date of Patent: Mar. 6, 2018

(54) CARRIER FOR EXHAUST GAS PURIFICATION CATALYST AND EXHAUST GAS PURIFICATION CATALYST

(71) Applicant: MITSUI MINING & SMELTING CO., LTD., Tokyo (JP)

(72) Inventors: Masato Machida, Kumamoto (JP); Yuki Nagao, Saitama (JP); Michiyo Matsumoto, Saitama (JP); Yunosuke Nakahara, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 15/325,618

(22) PCT Filed: Jan. 12, 2016

(86) PCT No.: PCT/JP2016/050647
§ 371 (c)(1),
(2) Date: Jan. 11, 2017

(87) PCT Pub. No.: WO2016/125539
PCT Pub. Date: Aug. 11, 2016

(65) Prior Publication Data
US 2017/0144136 A1    May 25, 2017

(30) Foreign Application Priority Data

Feb. 2, 2015 (JP) .................. 2015-018440

(51) Int. Cl.
*B01J 27/185* (2006.01)
*B01D 53/94* (2006.01)
*B01J 27/187* (2006.01)

(52) U.S. Cl.
CPC ...... *B01J 27/1856* (2013.01); *B01D 53/9454* (2013.01); *B01J 27/187* (2013.01); *B01J 27/1853* (2013.01); *B01D 2255/1025* (2013.01)

(58) Field of Classification Search
None
See application file for complete search history.

(56) References Cited

U.S. PATENT DOCUMENTS 7,179,430 B1 * 2/2007 Stobbe ............... B01D 39/2093
                                                           422/180
2007/0221132 A1 * 9/2007 Chandran ............... C23C 18/00
                                                           118/728

FOREIGN PATENT DOCUMENTS

| JP | 8-150339    | 6/1996    |
|----|-------------|-----------|
| JP | 10-95662    | 4/1998    |
| JP | 11-90226    | 4/1999    |
| JP | 11-267509   | 10/1999   |
| JP | 2002-159859 | 6/2002    |
| JP | 2004-286739 | 10/2004   |
| JP | 2010-440    | 1/2010    |
| JP | 2012-193523 | * 3/2011  |
| JP | 2012-193523 | 10/2012   |
| JP | 2013-252465 | 12/2013   |

OTHER PUBLICATIONS

NASICON. Wikipedia, 2017.*
JP 10-095662, Apr. 1998, Translation.*
JP 2002-159859, Jun. 2002, Translation.*
International Search Report of PCT/JP2016/050647 dated Apr. 5, 2016.

* cited by examiner

*Primary Examiner* — Melvin C Mayes
*Assistant Examiner* — Colette Nguyen
(74) *Attorney, Agent, or Firm* — Rankin, Hill & Clark LLP

(57) ABSTRACT

The invention relates to a catalyst carrier for exhaust gas purification catalyst which contains a metal phosphate containing Zr, and it provides a new catalyst carrier which exhibits excellent NOx purification performance in a high temperature region. The invention proposes a carrier for exhaust gas purification catalyst containing a metal phosphate which has a NASICON type structure and contains Zr.

2 Claims, No Drawings

CARRIER FOR EXHAUST GAS PURIFICATION CATALYST AND EXHAUST GAS PURIFICATION CATALYST

TECHNICAL FIELD

The present invention relates to an exhaust gas purification catalyst which can be used for purifying exhaust gas discharged from internal combustion engines such as a gasoline engine of a two-wheeled or four-wheeled vehicle and a diesel engine and a carrier for exhaust gas purification catalyst to be used therein.

BACKGROUND ART

The exhaust gas discharged from a vehicle using gasoline as fuel contains harmful components such as hydrocarbons (THC), carbon monoxide (CO), and nitrogen oxides (NOx). Hence, it is required to purify each of the harmful components so as to convert the hydrocarbons (THC) into water and carbon dioxide through oxidation, carbon monoxide (CO) into carbon dioxide through oxidation, and the nitrogen oxides (NOx) into nitrogen through reduction.

As the catalyst (hereinafter, referred to as the "exhaust gas purification catalyst") for treating such exhaust gas, a three way catalyst (TWC) which is able to oxidize or reduce CO, THC, and NOx is used.

As such a three way catalyst, one that is obtained by supporting a precious metal on an oxide porous material having a high specific surface area, for example, an alumina porous material having a high specific surface area and supporting this on a substrate, for example, a monolithic substrate having a refractory ceramic or metallic honeycomb structure or on refractory particles is known.

Meanwhile, the exhaust gas discharged from a diesel engine contains sulfates derived from the sulfur component in the fuel and tar-like fine particulate materials (referred to as "PM") due to incomplete combustion, and the like in addition to CO, THC, and NOx described above.

As a device for removing CO and THC contained in the exhaust gas discharged from a diesel engine, a diesel oxidation catalyst (referred to as "DOC") is known.

As DOC, one that is obtained by coating a refractory inorganic porous material such as zeolite or $Al_2O_3$ on a porous filter substrate having a honeycomb structure is known.

A precious metal such as platinum (Pt), palladium (Pd), or rhodium (Rh) is often used in both of the catalysts that are a catalyst for purifying the exhaust gas discharged from a gasoline engine and a catalyst for purifying the exhaust gas discharged from a diesel engine as a catalytically active component. Moreover, the bonding strength between these precious metals as a catalytically active component and the substrate is not so strong and the specific surface area of the substrate itself is not also so great, and it is thus difficult to support the precious metal on the substrate in a sufficient supporting amount and a highly dispersed manner even when it is attempted to directly support the precious metal on the substrate. Hence, it is general to support a precious metal on a particulate catalyst carrier having a high specific surface area in order to support a sufficient amount of a catalytically active component on the surface of a substrate in a highly dispersed manner.

As this kind of carrier for exhaust gas purification catalyst (also referred to as the "catalyst carrier" or "carrier"), porous particles composed of refractory inorganic oxides such as silica, alumina, and titania compounds are now widely used.

The purification properties (ternary properties) of CO, HC, and NOx by the three way catalyst are closely related to the stoichiometric air-fuel ratio (A/F) which indicates the atmosphere of the exhaust gas discharged from a motor vehicle, and it has thus been general in the prior art to control the purification properties to the condition of being mainly A/F=14.6 (stoichiometric air-fuel ratio) in which the exhaust gas purifying function is sufficiently exerted, namely, the condition of being in the vicinity of an excess air ratio $\lambda=1$.

In recent years, the control of engine at an air-fuel ratio higher than the stoichiometric air-fuel ratio (A/F=14.6), namely, under a lean condition of about $14.6<A/F\leq16.0$ has been desired from the viewpoint of the improvement of fuel consumption and the cutback of carbon dioxide emissions. It is possible to suppress the generation of $CO_2$ of the combustion exhaust gas as well as the fuel consumption is improved since the amount of fuel used decreases if the internal combustion engine is driven under a lean condition to cause lean burn in an oxygen-rich atmosphere.

However, under the lean condition as described above, oxygen is excessive and the NOx purification performance by the exhaust gas purification catalyst significantly deteriorates, and the development of a catalyst capable of purifying NOx at a high efficiency even under the lean condition has thus been desired.

Accordingly, a metal phosphate has attracted attention as a catalyst carrier which exhibits excellent NOx purification performance under the lean condition and also excellent sulfur poisoning resistance.

For example, an exhaust gas purification catalyst in which one kind or two or more kinds of precious metals selected from the group consisting of Pt, Pd, Rh, and Ir are supported on a phosphoric acid compound of aluminum phosphate, zirconium phosphate, or silicoaluminophosphate at from 0.01 to 5 wt % is disclosed in Patent Document 1 (JP 8-150339 A).

A denitrification catalyst obtained by supporting iridium as an active metal on a carrier composed of at least one or more kinds of compounds selected from a metal carbonate, a metal sulfate, and a metal phosphate is disclosed in Patent Document 2 (JP 11-267509 A).

An exhaust gas purification catalyst which is used for purifying NOx in the exhaust gas that is discharged from an internal combustion engine and contains oxygen in an excess amount and constituted by a carrier which includes an anion portion composed of a compound containing phosphorus oxide or sulfur oxide and a cation portion for compensating a charge and has a high solid acid strength and a precious metal element supported on this carrier is disclosed in Patent Document 3 (JP 2010-440 A).

In Patent Document 4 (JP 2013-252465A), a catalyst carrier for exhaust gas purification containing a phosphate represented by a general formula, $MPO_4$ (in the formula, M is Y, La, or Al) or zirconium phosphate represented by a formula, $ZrP_2O_7$ is disclosed as a catalyst carrier for exhaust gas purification which suppresses a decrease in $NO_x$ purification activity in a lean region in which the excess air ratio $\lambda$ is greater than 1 and can significantly improve the performance as compared to Rh-supporting zirconia, and a catalyst structure for exhaust gas purification including a catalyst for exhaust gas purification containing a precious metal which includes at least Rh and is supported on the carrier, a catalyst support composed of a ceramic or a metal material, and a layer of the catalyst for exhaust gas purification that is supported on the catalyst support is disclosed.

CITATION LIST

Patent Document

Patent Document 1: JP 8-150339 A
Patent Document 2: JP 11-267509 A
Patent Document 3: JP 2010-440 A
Patent Document 4: JP 2013-252465 A

SUMMARY OF THE INVENTION

Problem to be Solved by the Invention

The invention relates to a catalyst carrier for exhaust gas purification catalyst which contains a metal phosphate containing Zr, and an object thereof is to provide a new catalyst carrier for exhaust gas purification which exhibits excellent NOx purification performance particularly in a high temperature region as compared to a catalyst carrier for exhaust gas purification which contains zirconium phosphate represented by a formula, $ZrP_2O_7$ and is disclosed in the prior art.

Means for Solving Problem

The invention proposes a carrier for exhaust gas purification catalyst containing a metal phosphate which has a NASICON type structure and contains Zr.

Effect of the Invention

The carrier for exhaust gas purification catalyst proposed by the invention exhibits excellent NOx purification performance particularly in a high temperature region as compared to a catalyst carrier for exhaust gas purification which contains zirconium phosphate represented by a formula, $ZrP_2O_7$ and is disclosed in the prior art.

In addition, this kind of metal phosphate not only exhibits excellent NOX purification performance in the lean region but also exhibits excellent sulfur poisoning resistance, and it is thus particularly suitable as a catalyst carrier for exhaust gas purification catalyst to be used for purifying the exhaust gas discharged from internal combustion engines such as a gasoline engine of a two-wheeled or four-wheeled vehicle and a diesel engine.

MODE(S) FOR CARRYING OUT THE INVENTION

Next, the invention will be described with reference to examples of the embodiments. However, the invention is not limited to the embodiments to be described below.

<Present Catalyst>

The exhaust gas purification catalyst (hereinafter, referred to as the "present catalyst") as an example of embodiments of the invention is a composition containing a catalyst carrier (hereinafter, referred to as the "present catalyst carrier") and a catalytically active component to be supported on the catalyst carrier, and it can contain a promoter such as an OSC material, a stabilizer, and other components if necessary.

<Present Catalyst Carrier>

The present catalyst carrier is a carrier for exhaust gas purification catalyst containing a metal phosphate which has a NASICON type structure and contains Zr.

Incidentally, the present catalyst carrier may contain other components other than the metal phosphate described above as long as the action of the metal phosphate is not interfered.

However, in the present catalyst carrier, it is preferable that the content of the metal phosphate is 90 mass % or more and preferably 95 mass % or more.

The metal phosphate is preferably a metal phosphate which has a NASICON type structure and is represented by Formula (1) . . . $MxZr_2(PO_4)_3$ (M in the formula includes one kind or two or more kinds among the elements belonging to rare earth elements, transition metals, and alkaline earth metals, and x is from 0.25 to 1).

In Formula (1) . . . $MZr_2(PO_4)_3$, it is preferable that M in Formula (1) includes one kind or two or more kinds among the elements belonging to rare earth elements, transition metals, and alkaline earth metals.

Here, examples of the rare earth elements may include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

In addition, examples of the first row transition elements (3d transition elements) belonging to the transition metals may include scandium (Sc), titanium (Ti), vanadium (V), chromium (Cr), manganese (Mn), iron (Fe), cobalt (Co), nickel (Ni), copper (Cu), and zinc (Zn), examples of the second row transition elements (4d transition elements) belonging to the transition metals may include yttrium (Y), zirconium (Zr), niobium (Nb), molybdenum (Mo), technetium (Tc), ruthenium (Ru), rhodium (Rh), palladium (Pd), silver (Ag), and cadmium (Cd), and examples of the third row transition elements (4f transition elements) belonging to the transition metals may include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho) erbium (Er), thulium (Tm), ytterbium (Yb) and lutetium (Lu), hafnium (Hf), tantalum (Ta), tungsten (W), rhenium (Re), osmium (Os), iridium (Ir), platinum (Pt), and gold (Au).

In addition, examples of the alkaline earth metals may include beryllium (Be), magnesium (Mg), calcium (Ca), strontium (Sr), barium (Ba), and radium (Ra).

Moreover, M in Formula (1) may be one kind or two or more kinds among these.

Among them, M in Formula (1) is even more preferably one kind or two or more kinds among manganese (Mn), lanthanum (La), iron (Fe), cerium (Ce), praseodymium (Pr), neodymium (Nd), yttrium (Y), and cobalt (Co) from the viewpoint of heat resistance.

Particularly among these, the rare earth elements such as lanthanum (La), yttrium (Y), neodymium (Nd), cerium (Ce), and praseodymium (Pr) are even more preferable from the viewpoint of being able to be synthesized as one having a high specific surface area so that the initial specific surface area thereof in the case of being synthesized by a hydrothermal method exceeds 20 $m^2/g$ and to support a great amount of a precious metal.

Incidentally, it is acceptable that the metal phosphate contains an element other than the elements exemplified above to the extent to which the effect of the invention is not impaired.

In addition, x in Formula (1), namely, the molar ratio of the element M may be from 0.25 to 1. The molar ratio is a value that is inevitably determined depending on the valence of element M within the above numerical value range as long as the metal phosphate has a NASICON type structure.

It is more preferable as the specific surface area (BET method) of the catalyst carrier is greater, and for example, it is even more preferably 1 $m^2/g$ or more, 2 $m^2/g$ or more among them, and 5 m²/g or more among them. The upper limit value of the specific surface area is empirically about 180 m²/g and more stably about 100 m²/g.

In addition, in consideration of the durability of the present catalyst carrier in the case of being actually mounted on a motor vehicle, it is preferable to maintain the specific surface area in the above range even after the exhaust gas aging as evaluated in Examples to be described later.

In consideration of a balance between the coating stability to the substrate and the gas diffusibility in the catalyst layer, the average particle size of the catalyst carrier is preferably from 0.1 μm to 10 μm, and it is even more preferably 1 μm or more or 5 μm or less among them.

The average particle size of the catalyst carrier can be determined by measuring the size by directly observing the particles through a SEM (scanning electron microscope) and averaging the measured values.

(Method for Producing Present Catalyst Carrier)

An example of the method for producing the present catalyst carrier will be described.

For example, a raw material for the element M and a raw material for Zr in $M_xZr_2(PO_4)_3$ are introduced into deionized water or an organic solvent such as ethanol and dissolved, phosphoric acid is also introduced thereinto to obtain a solution, an alkali solution such as ammonia water is added to the solution to adjust the pH thereof to from 3 to 11 and preferably from 4 to 10, a gelatinous product is generated, and the gelatinous product thus obtained is washed with deionized water and the like, filtered, dried, and calcined for from 1 hour to 24 hours at from 550 to 1400° C. in an oxidizing atmosphere (air), whereby a metal phosphate having a NASICON type structure can be fabricated.

In addition, a raw material for the element M and a raw material for Zr in $M_xZr_2(PO_4)_3$ are introduced into deionized water or an organic solvent such as ethanol and dissolved, an alkali solution such as ammonia water is added to this solution to adjust the pH thereof to from 4.5 to 11 and preferably from 4.5 to 10, a precipitate is generated, and washed with deionized water and the like as well as subjected to centrifugal separation, and the precipitate is collected. Thereafter, this precipitate is introduced into deionized water or an organic solvent such as ethanol and stirred, phosphoric acid is added thereto and stirred, the solution thus obtained is then heated by using an autoclave and the like to be hydrothermally treated, thereafter, the precipitate subjected to the hydrothermal treatment is dried, and calcined for from 1 hour to 24 hours at from 550 to 1400° C. in an oxidizing atmosphere (air), whereby a metal phosphate having a NASICON type structure can be fabricated.

However, the method for producing the present catalyst carrier is not limited to these methods.

<Another Catalyst Carrier>

The present catalyst may contain other inorganic porous particles as a catalyst carrier in addition to the present catalyst carrier.

Examples of the other inorganic porous particles may include porous particles of compounds such as silica, alumina, and titania compounds, and more specifically, porous particles composed of a compound selected from alumina, silica, silica-alumina, alumino-silicate, alumina-zirconia, alumina-chromia, and alumina-ceria.

As other inorganic porous particles, for example, an OSC material, namely, a promoter having an oxygen storage capacity (OSC) may be contained.

Examples of the OSC material may include a cerium compound, a zirconium compound, and a ceria and zirconia composite oxide.

<Catalytically Active Component>

Examples of the catalytically active component contained in the present catalyst, namely, a metal exhibiting catalytic activity may include a metal such as palladium, platinum, rhodium, gold, silver, ruthenium, iridium, nickel, cerium, cobalt, copper, iron, manganese, osmium, or strontium. In addition, an oxide of these can also be preferably employed.

In particular, platinum exhibiting higher S poisoning resistance than palladium or rhodium is more suitable for the application to a diesel engine which discharges a sulfur component of a poisoning substance derived from the fuel in a more amount, and palladium or rhodium is more suitable than platinum for the application to a gasoline engine which discharges a sulfur component in a less amount in consideration of S poisoning resistance and cost.

The amount of the catalytically active component supported in the present catalyst is preferably from 0.1 to 5.0 mass % in terms of the metal mass of the active component based on the mass of the carrier, it is even more preferably 0.5 mass % or more or 3.0 mass % or less among them, and it is even more preferably 2.0 mass % or less among them since the effect as a catalyst is likely to be exerted when the amount is 0.1 mass % or more and the degree of dispersion after aging is likely to be maintained when the amount is 5 mass % or less.

From the same viewpoint, the amount of the catalytically active component supported is preferably from 0.1 to 5.0 mass % with respect to the mass of the present catalyst, namely, the total mass of the catalytically active component and the present catalyst carrier, it is even more preferably 0.5 mass % or more or 3.0 mass % or less among them, and it is even more preferably 2.0 mass % or less among them in particular.

<Stabilizer and Other Components>

The present catalyst can contain a stabilizer, a binder, and other components.

Examples of the stabilizer may include an alkaline earth metal, an alkali metal, or a lanthanide metal. Among them, it is possible to select one kind or two or more kinds among the metals selected from the group consisting of magnesium, barium, boron, thorium, hafnium, silicon, calcium, lanthanum, neodymium, and strontium.

In addition, the present catalyst may contain a known additive component such a binder component.

As the binder component, an inorganic binder, for example, a water-soluble solution such as alumina sol can be used.

<Method for Producing Present Catalyst>

Next, an example of a method for producing the present catalyst will be described. However, the method for producing the present catalyst is not limited to an example to be described below.

The present catalyst can be produced, for example, by mixing the present catalyst carrier, a catalytically active component, for example, a precious metal compound, and other components, drying the mixture through heating, and then calcining the dry mixture.

Examples of the solution of a precious metal compound may include a nitrate, a chloride, and a sulfate of a precious metal.

Examples of the other components may include a promoter such as an OSC material, a stabilizer, and a binder.

<Present Catalyst Structure>

It is possible to fabricate a catalyst structure for exhaust gas purification (referred to as the "present catalyst structure") equipped with a catalyst layer composed of the present catalyst and, for example, a substrate composed of a ceramic or a metal material.

The catalyst layer may be, for example, one that has a configuration in which a catalyst layer is formed on the surface of a substrate, one that has a configuration in which a catalyst layer is formed on the surface of a substrate via another layer, or one that has a configuration in which a catalyst layer is formed on a place other than the surface side of a substrate.

In any production method, the catalyst layer may be a single layer or a multilayer consisting of two or more layers.

(Substrate)

As the substrate of the present catalyst structure, a presently known substrate can be widely employed.

Examples of the material for the substrate may include a refractory material such as a ceramic or a metal material.

Examples of the material for the ceramic substrate may include a refractory ceramic material, for example, cordierite, cordierite-alpha alumina, silicon carbide (SiC), silicon nitride, mullite, alumina, aluminum titanate, zircon mullite, spodumene, alumina-silica magnesia, zircon silicate, sillimanite, magnesium silicate, zircon, petalite, alpha alumina, and an aluminosilicate.

Examples of the material for the metal substrate may include a refractory metal, for example, other suitable corrosion resistant alloys containing stainless steel or iron as the base, for example, a refractory metal, for example, an Fe—Cr—Al alloy.

The shape of the substrate is not particularly limited. In general, it is a shape such as a honeycomb, a plate, or a pellet, and it is preferably a honeycomb shape.

In addition, it may be a shape which is mainly used in a particulate filter. Examples thereof may include a wall-through type, a flow-through honeycomb type, a wire mesh type, a ceramic fiber type, a metal porous material type, a particle-filled type, and a foam type.

In the case of using a substrate having a honeycomb shape, for example, it is possible to use a monolithic substrate having a great number of fine gas flow passages, namely, channels parallel to the inside of the substrate so that a fluid flows through the inside of the substrate. At this time, it is possible to form a catalyst layer by coating the present catalyst on the inner wall surface of each channel of the monolithic substrate.

(Method for Producing Present Catalyst Structure)

As a method for producing the present catalyst structure, for example, the present catalyst carrier, a catalytically active component, for example, a precious metal, and an OSC material, a binder, and water if necessary are mixed together and stirred to be formed into a slurry, the slurry thus obtained is coated, for example, on a substrate such as a ceramic honeycomb material, and this is calcined to form a catalyst layer on the substrate surface, whereby the present catalyst structure can be fabricated.

In addition, the present catalyst carrier and an OSC material, a binder, and water if necessary are mixed together and stirred to be formed into a slurry, the slurry thus obtained is coated, for example, on a substrate such as a ceramic honeycomb material, this is immersed in a solution of a catalytically active component to adsorb the catalytically active component onto the catalyst carrier layer, and this is calcined to form a catalyst layer on the substrate surface, whereby the present catalyst structure can be fabricated.

In addition, a catalytically active component support obtained by supporting a catalytically active component on an oxide, the present catalyst carrier and an OSC material, a binder, and water if necessary are mixed together and stirred to be formed into a slurry, this is coated, for example, on a substrate, and this is calcined to form a catalyst layer on the substrate surface, whereby the present catalyst structure can be fabricated.

Incidentally, it is possible to employ any known method as the method for producing the present catalyst, and the method is not limited to the examples described above.

<Description of Phrase>

In the present specification, in a case in which it is expressed to be "X to Y" (X and Y are arbitrary numbers), it also includes the meaning to be "preferably greater than X" or "preferably smaller than Y" together with the meaning to be "X or more and Y or less" unless otherwise stated.

In addition, in a case in which it is expressed to be "X or more" (X is an arbitrary number) or "Y or less" (Y is an arbitrary number), it also includes the intention to be "preferably greater than X" or "preferably less than Y".

EXAMPLES

Hereinafter, the invention will be described in more detail with reference to Examples and Comparative Examples.

Example 1

$ZrCl_2O.8H_2O$ and $Mn(NO_3)_3.6H_2O$ were respectively weighed so as to have the target predetermined ratio, and dissolved in 100 mL of ion-exchanged water, ammonia water was added dropwise to this solution to adjust the pH to about 10, and a precipitate was generated. This precipitate was subjected to centrifugal separation, then washed with ion-exchange water, and the precipitate was recovered.

To the precipitate thus recovered, 100 mL of ion-exchanged water was added and stirred for 0.5 hour, $H_3PO_4$ (85%) was added thereto to prepare a mixture. This mixture was stirred for 6 hours at room temperature, then introduced into an autoclave and hydrothermally treated for 18 hours at 200° C. Thereafter, the precipitate subjected to the hydrothermal treatment was introduced into a vacuum dryer, dried for 12 hours, temporarily calcined for 3 hours at 600° C. in the air atmosphere, and then calcined for 6 hours at 900° C. in the air atmosphere, thereby fabricating a metal phosphate carrier (sample) having a NASICON type structure.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 15 $m^2/g$.

Example 2

A metal phosphate carrier (sample) having a NASICON type structure was fabricated in the same manner as in Example 1 except that $La(NO_3)_2.6H_2O$ was used instead of $Mn(NO_3)_3.6H_2O$ in Example 1.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 39 $m^2/g$.

Example 3

A metal phosphate carrier (sample) having a NASICON type structure was fabricated in the same manner as in Example 1 except that $Fe(NO_3)_2 \cdot 9H_2O$ was used instead of $Mn(NO_3)_3 \cdot 6H_2O$ in Example 1.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 9 $m^2/g$.

Example 4

A metal phosphate carrier (sample) having a NASICON type structure was fabricated in the same manner as in Example 1 except that $Ce(NO_3)_3$ was used instead of $Mn(NO_3)_3 \cdot 6H_2O$ in Example 1.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 23 $m^2/g$.

Example 5

A metal phosphate carrier (sample) having a NASICON type structure was fabricated in the same manner as in Example 1 except that $Co(NO_3)_3$ was used instead of $Mn(NO_3)_3 \cdot 6H_2O$ in Example 1.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 11 $m^2/g$.

Example 6

A metal phosphate carrier (sample) having a NASICON type structure was fabricated in the same manner as in Example 1 except that $Y(NO_3)_3$ was used instead of $Mn(NO_3)_3 \cdot 6H_2O$ in Example 1.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 63 $m^2/g$.

Example 7

A metal phosphate carrier (sample) having a NASICON type structure was fabricated in the same manner as in Example 1 except that $Nd(NO_3)_3$ was used instead of $Mn(NO_3)_3 \cdot 6H_2O$ in Example 1.

At this time, it was confirmed that the metal phosphate carrier (sample) thus fabricated and obtained had a NASICON type structure and a composition presented in Table 1 through XRD diffraction. The BET specific surface area of the metal phosphate carrier (sample) thus fabricated and obtained was 31 $m^2/g$.

Comparative Example 1

$ZrCl_2 \cdot 8H_2O$ was weighed so as to have the target predetermined ratio, and dissolved in 100 mL of ion-exchanged water, ammonium carbonate, ammonium phosphate, and hexadecyltrimethylammonium bromide (CTAB) were added dropwise to this solution to generate a precipitate, the precipitate was subjected to centrifugal separation, then washed with ion-exchanged water, and recovered.

To the precipitate thus recovered, 100 mL of ion-exchanged water was added, and the precipitate was introduced into an autoclave and hydrothermally treated for 24 hours at 120° C. Thereafter, the precipitate subjected to the hydrothermal treatment was introduced into a vacuum dryer, dried for 12 hours and calcined for 6 hours at 900° C. in the air atmosphere, thereby fabricating a metal phosphate carrier (sample).

At this time, it was confirmed that the metal phosphate carrier (sample) thus fabricated and obtained had a composition presented in Table 1 through XRD diffraction and ICP analysis.

<Test for Evaluation>
(Fabrication of Evaluation Sample)

The metal phosphate carriers (samples) prepared in Examples 1 to 7 and Comparative Example 1 were added to a solution of Rh nitrate and immersed in a quantity ratio so that the concentration of Rh supported was 0.4 mass % in terms of the mass of Rh metal based on the mass of the carrier, thereafter subjected to evaporation to dryness, and calcined for 3 hours at 600° C. in the air atmosphere, thereby preparing Rh-supporting catalysts (evaluation samples).

(Method for Evaluation)

The Rh-supporting catalysts (evaluation samples) prepared in this manner were aged, and the catalytic activity thereof was then evaluated as follows.

The aging treatment was conducted by heating the Rh-supporting catalysts (evaluation samples) for 25 hours at 900° C. in the air atmosphere containing water vapor at 10%.

A fixed bed flow type reactor was used, 0.05 g of the Rh-supporting catalyst (evaluation sample) was set in the reaction tube, a simulated exhaust gas which assumed complete combustion and was composed of CO: 0.51%, NO: 0.05%, $C_3H_6$: 0.0394%, $O_2$: 0.4%, and He as the balance was allowed to flow through the reaction tube so as to have W/F (catalyst mass/gas flow rate)=$5.0 \times 10^{-4}$ $g \cdot min \cdot cm^{-3}$, and the gas components at the outlet at from room temperature to 600° C. was measured by using Q-mass and NDIR.

Thereafter, the temperature (T50) at which the purification rate reached 50% was determined from the results of the light-off performance evaluation thus obtained.

TABLE 1

| | Carrier | Specific surface area $m^2/g$ | T50 (° C.) CO | NO | $C_3H_6$ |
|---|---|---|---|---|---|
| Comparative Example 1 | $ZrP_2O_7$ | 14 | 330 | 339 | 346 |
| Example 1 | $Mn_{0.5}Zr_2(PO_4)_3$ | 10 | 296 | 304 | 328 |
| Example 2 | $La_{0.33}Zr_2(PO_4)_3$ | 19 | 300 | 311 | 325 |
| Example 3 | $Fe_{0.33}Zr_2(PO_4)_3$ | 6 | 319 | 329 | 337 |
| Example 4 | $Ce_{0.33}Zr_2(PO_4)_3$ | 11 | 318 | 327 | 335 |
| Example 5 | $Co_{0.5}Zr_2(PO_4)_3$ | 7 | 312 | 320 | 335 |
| Example 6 | $Y_{0.33}Zr_2(PO_4)_3$ | 21 | 263 | 271 | 279 |
| Example 7 | $Nd_{0.33}Zr_2(PO_4)_3$ | 20 | 325 | 331 | 339 |

(Discussion)

From Examples described above and the results of the tests which the inventors have so far carried out, it has was confirmed that a catalyst carrier containing a metal phosphate which has a NASICON type structure and contains Zr, a carrier for catalyst composed of a metal phosphate represented by a formula: $M_xZr_2(PO_4)_3$ (M in the formula includes one kind or two or more kinds among the elements belonging to rare earth elements, transition metals, and alkaline earth metals, and x is from 0.25 to 1) among them has superior purification performance after aging as compared to the catalyst carrier composed of zirconium phosphate represented by a formula, $ZrP_2O_7$.

Comparative Example 2

Zirconium nitrate dihydrate was dissolved in deionized water, phosphoric acid was introduced into this solution to obtain a solution, subsequently, 10 mass % ammonia water was gradually added dropwise to this solution to generate a gelatinous product, and the gelatinous product thus obtained was washed with deionized water, filtered, and dried for the night at 120° C. After drying, the gelatinous product was calcined for 5 hours at 900° C. in the air, thereby fabricating a metal phosphate carrier (sample).

At this time, it was confirmed that the metal phosphate carrier (sample) thus fabricated and obtained had a composition presented in Table 2 through XRD diffraction and ICP analysis.

Example 8

$Pr(NO_3)_2.6H_2O$ and zirconium nitrate dihydrate were respectively weighed so as to have the target predetermined ratio, these were added to deionized water and dissolved, phosphoric acid was introduced into the solution to obtain a solution, 10 mass % ammonia water was gradually added dropwise to this solution to generate a gelatinous product, and the gelatinous product thus obtained was washed with deionized water, filtered, and dried for the night at 120° C. After drying, the gelatinous product was calcined for 5 hours at 900° C. in the air, thereby fabricating a metal phosphate carrier (sample).

At this time, it was confirmed that the metal phosphate carrier (sample) thus fabricated and obtained had a NASICON type structure and a composition presented in Table 2 through XRD diffraction and ICP analysis. The BET specific surface area of the metal phosphate carrier (sample) thus fabricated and obtained was 37 $m^2/g$.

Example 9

A metal phosphate carrier (sample) having a NASICON type structure was fabricated in the same manner as in Example 8 except that $Nd(NO_3)_2.6H_2O$ was used instead of $Pr(NO_3)_2.6H_2O$ in Example 8.

At this time, it was confirmed that the metal phosphate carrier (sample) thus fabricated and obtained had a NASICON type structure and a composition presented in Table 2 through XRD diffraction and ICP analysis.

Example 10

A metal phosphate carrier (sample) having a NASICON type structure was fabricated in the same manner as in Example 8 except that $Y(NO_3)_2.6H_2O$ was used instead of $Pr(NO_3)_2.6H_2O$ in Example 8.

At this time, it was confirmed that the metal phosphate carrier (sample) thus fabricated and obtained had a NASICON type structure and a composition presented in Table 2 through XRD diffraction and ICP analysis.

Example 11

A metal phosphate carrier (sample) having a NASICON type structure was fabricated in the same manner as in Example 8 except that $Ce(NO_3)_2$ was used instead of $Pr(NO_3)_2.6H_2O$ in Example 8.

At this time, it was confirmed that the metal phosphate carrier (sample) thus fabricated and obtained had a NASICON type structure and a composition presented in Table 2 through XRD diffraction and ICP analysis.

Example 12

A metal phosphate carrier (sample) having a NASICON type structure was fabricated in the same manner as in Example 8 except that $Mn(NO_3)_2.6H_2O$ was used instead of $Pr(NO_3)_2.6H_2O$ in Example 8.

At this time, it was confirmed that the metal phosphate carrier (sample) thus fabricated and obtained had a NASICON type structure and a composition presented in Table 2 through XRD diffraction and ICP analysis.

Example 13

A metal phosphate carrier (sample) having a NASICON type structure was fabricated in the same manner as in Example 8 except that $Co(NO_3)_2$ was used instead of $Pr(NO_3)_2.6H_2O$ in Example 8.

At this time, it was confirmed that the metal phosphate carrier (sample) thus fabricated and obtained had a NASICON type structure and a composition presented in Table 2 through XRD diffraction and ICP analysis.

<Test for Evaluation>
(Fabrication of Evaluation Sample)

With regard to Comparative Example 2, 73 parts by mass of the metal phosphate carrier (sample) prepared in Comparative Example 2, 21 parts by mass of La-stabilized alumina, and 6 parts by mass of an alumina-based binder were added to a solution of hexamine Rh hydroxide, and subjected to the wet grinding treatment, thereby obtaining a Rh-containing slurry. At this time, a solution of Rh nitrate was added so that the concentration of Rh supported was 0.15 mass % with respect to the solids.

The slurry thus obtained was coated on a ceramic honeycomb substrate so as to be 100 g/L, dried, and calcined, thereby preparing a Rh-supporting honeycomb catalyst (evaluation sample).

Meanwhile, with regard to Examples 8 to 13, 73 parts by mass of the metal phosphate carrier (sample) prepared in Examples 8 to 13, 21 parts by mass of La-stabilized alumina, and 6 parts by mass of an alumina-based binder were added to a solution of Rh nitrate, and subjected to the wet grinding treatment, thereby obtaining a Rh-containing slurry. At this time, a solution of Rh nitrate was added so that the concentration of Rh supported was 0.15 mass % with respect to the solids.

The slurry thus obtained was coated on a ceramic honeycomb substrate so as to be 100 g/L, dried, and calcined, thereby preparing a Rh-supporting honeycomb catalyst (evaluation sample).

(Method for Evaluation)

The Rh-supporting honeycomb catalysts (evaluation samples) obtained in Comparative Example 2 and Examples 8 to 13 were aged, and the catalytic activity thereof was then evaluated as follows.

As the conditions for simulated exhaust gas aging, the catalyst was set in an electric furnace kept at 800° C., and the simulated exhaust gas was allowed to flow through the electric furnace while periodically allowing $C_3H_6$ or a mixed gas (50 sec) of CO and $O_2$ (complete combustion ratio) and the air (50 sec) to flow therethrough, thereby being treated for 50 hours.

As the evaluation of the honeycomb catalyst, a simulated exhaust gas consisting of CO, $CO_2$, $C_3H_6$, $O_2$, NO, $H_2O$, and $N_2$ as the balance was allowed to flow through the Rh-supporting honeycomb catalyst (evaluation sample) after the aging treatment described above so as to be $\lambda=1.63$ (A/F=14.9) and SV=100,000 $h^{-1}$, the gas components at the outlet at 400° C. was measured by using a NO analyzer (MOTOR EXHAUST GAS ANALYZER MEXA9100 manufactured by Horiba, Ltd.), the NO purification performance of the respective Rh-supporting catalysts was compared to one another.

TABLE 2

|  | Carrier | $\eta$ 400 NO |
|---|---|---|
| Comparative Example 2 | $ZrP_2O_7$ | 33.4 |
| Example 8 | $Pr_{0.33}Zr_2(PO_4)_3$ | 58.8 |
| Example 9 | $Nd_{0.33}Zr_2(PO_4)_3$ | 59.1 |
| Example 10 | $Y_{0.33}Zr_2(PO_4)_3$ | 60.5 |
| Example 11 | $Ce_{0.33}Zr_2(PO_4)_3$ | 62.4 |
| Example 12 | $Mn_{0.33}Zr_2(PO_4)_3$ | 64.6 |
| Example 13 | $Co_{0.33}Zr_2(PO_4)_3$ | 40.4 |

(Discussion)

From Examples described above and the results of the tests which the inventors have so far carried out, it has was confirmed that a catalyst carrier containing a metal phosphate which has a NASICON type structure and contains Zr, a carrier for catalyst composed of a metal phosphate represented by a formula: $MxZr_2(PO_4)_3$ (M in the formula includes one kind or two or more kinds among the elements belonging to rare earth elements, transition metals, and alkaline earth metals, and x is from 0.25 to 1) among them has superior NOx purification performance in a high temperature region as compared to the catalyst carrier composed of zirconium phosphate represented by a formula, $ZrP_2O_7$.

The invention claimed is:

1. A carrier for exhaust gas purification catalyst comprising a metal phosphate which has a NASICON type structure and contains Zr, wherein the metal phosphate is represented by a formula: $MxZr_2(PO_4)_3$ (M in the formula includes one or two or more elements selected from a group consisting of Pr, Nd, Y, Ce, Mn, La, and Fe, and x is from 0.25 to 1).

2. An exhaust gas purification catalyst comprising the carrier for exhaust gas purification catalyst according to claim 1 and a catalytically active component.

* * * * *